United States Patent

Ingham et al.

[15] 3,643,215

[45] Feb. 15, 1972

[54] PATTERN RECOGNITION DEVICE IN WHICH ALLOWANCE IS MADE FOR PATTERN ERRORS

[72] Inventors: William Ellis Ingham, Ealing; Michael Symons, Harrow; Peter Murden, Beaconsfield, all of England

[73] Assignee: Electric & Musical Industries Limited, Hayes, Middlesex, England

[22] Filed: Nov. 13, 1968

[21] Appl. No.: 775,410

[30] Foreign Application Priority Data

Nov. 15, 1967 Great Britain ....................52,012/67

[52] U.S. Cl. .........340/146.3 S, 340/146.3 T, 340/146.3 AH

[51] Int. Cl. ....................G06k 9/16

[58] Field of Search ....................340/146.3

[56] References Cited

UNITED STATES PATENTS

| | | | |
|---|---|---|---|
| 3,267,432 | 8/1966 | Bonner | 340/146.3 |
| 3,292,149 | 12/1966 | Bourne | 340/146.3 |
| 3,460,091 | 8/1969 | McCarthy et al. | 340/146.3 |
| 3,484,746 | 12/1969 | Fralick et al. | 340/146.3 |
| 3,522,585 | 8/1970 | Lemay | 340/146.3 |

*Primary Examiner*—Maynard R. Wilbur
*Assistant Examiner*—Leo H. Boudreau
*Attorney*—Fleit, Gipple & Jacobson

[57] ABSTRACT

A pattern recognition device comprises search means which are controlled initially to make a systematic search of a pattern presented for classification and produce signals descriptive of the features. It also comprises storage means in which are stored (a) a list of likelihoods of classes for given features, (b) a list of likelihoods of features for given classes, and (c) a list of mean distances between features for given classes. These lists may be built up during a self-organizing mode of operation of the device. The device further includes prediction means which, when a given number of features have been described by the search means, utilizes these features and the lists in the storage means and predicts the most likely class of the presented pattern, another feature likely to be associated with the features already described, and the locality of said feature. The control of the search means is then passed to the prediction means which cause a search to be carried out in the predicted locality. A signal produced as the result of the search in the predicted locality may be used either in a further prediction or to cause the systematic search to be resumed.

4 Claims, 4 Drawing Figures

Figure 1:
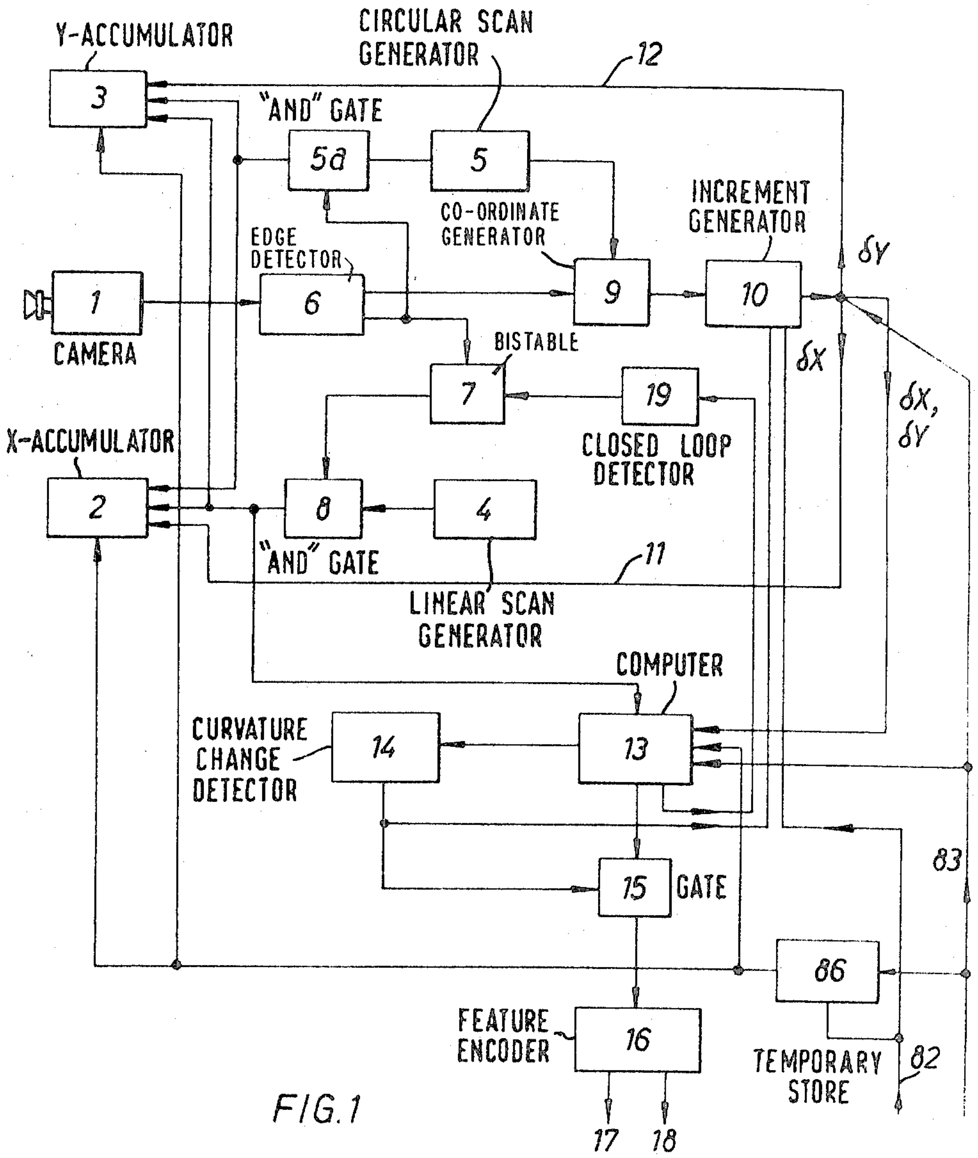

FIG. 2(part 1)
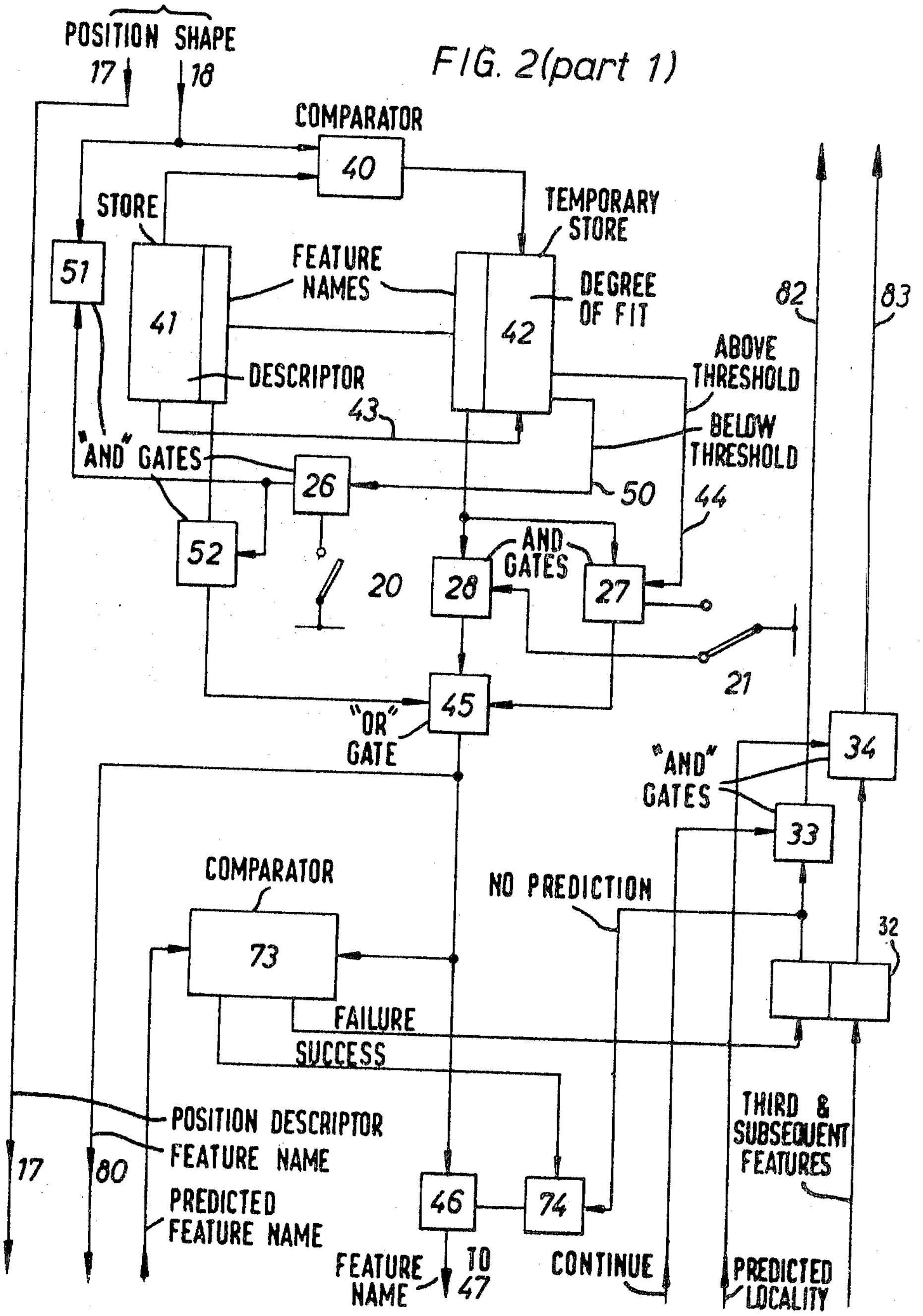

FIG. 2 (part 2)
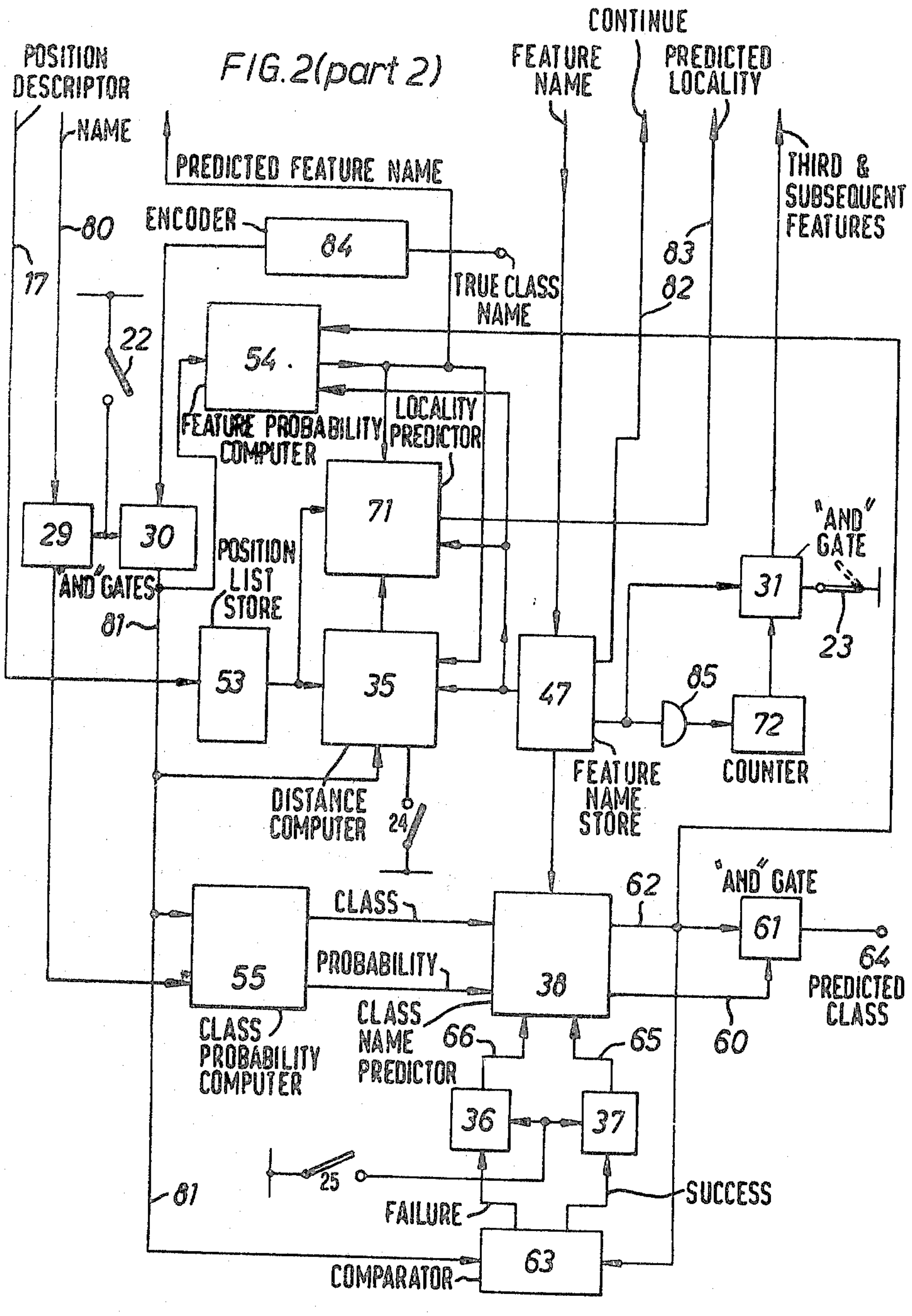

A PATTERN RECOGNITION DEVICE IN WHICH ALLOWANCE IS MADE FOR PATTERN ERRORS

The present invention relates to a pattern recognition device in which allowance is made for pattern errors.

Various devices have been proposed for recognizing patterns, that is, assigning them to particular classes, despite the possibility of variations of shape and size among different members of the same class. Such devices may for example be required to recognize printed or manuscript characters, blood cells or chromosomes.

The object of the present invention is to provide an improved pattern recognition device which can make allowances for substantial changes in size or shape among members of the same class and can also allow for gaps or mutilation of the edges of patterns to be recognized.

According to the present invention there is provided a pattern recognition device including:

a. search means for searching a pattern to be classified for features and for producing a signal descriptive of a feature or features sensed by said search means, b. storage means conditioned to store 1. signals representative of respective features
2. a list of relative positions of said features for given classes,
3. a list of likelihoods of classes of patterns for a given features, and
4. a list of the likelihoods of features for given classes, c. means for utilizing said descriptive signal in conjunction with said list of the likelihoods of classes of patterns for given features to select from said storage means a signal representative of the most likely class of said pattern, d. means for utilizing said signal representative of the most likely class of said pattern in conjunction with said list of the likelihoods of features for given classes to select from said storage means a signal representative of another feature which is likely to be associated with the feature or features sensed by said search means, e. means for deriving from said list of relative positions of said features for given classes a signal representative of the locality of said likely feature, f. means for searching said pattern at said locality and producing a further signal descriptive of a feature sensed at said locality, and g. means for utilizing said further descriptive signal in deciding if the selected class remains the most likely class.

Preferably the search means includes means for following the edge of the pattern to be recognized and for producing, as the signal descriptive of a feature, a signal which is at least descriptive of the curvature of the edge over a region in which the curvature is substantially constant. The use of such descriptive signals has the advantage that in many cases curvature is substantially invariant to changes of size or style of members of the same class. Clustering techniques may also be used in producing signals descriptive of features of the pattern to be recognized.

The search means may operate on a visual image of the pattern or may operate on a representation of the visual image, stored for example in magnetic core or drum store.

A device according to the present invention may have, in addition to its recognition mode of operation, a self organizing or "learning" mode during which it is adapted to accumulate said lists in said storage means in response to the operation of said search means on representative patterns.

Figure 3:
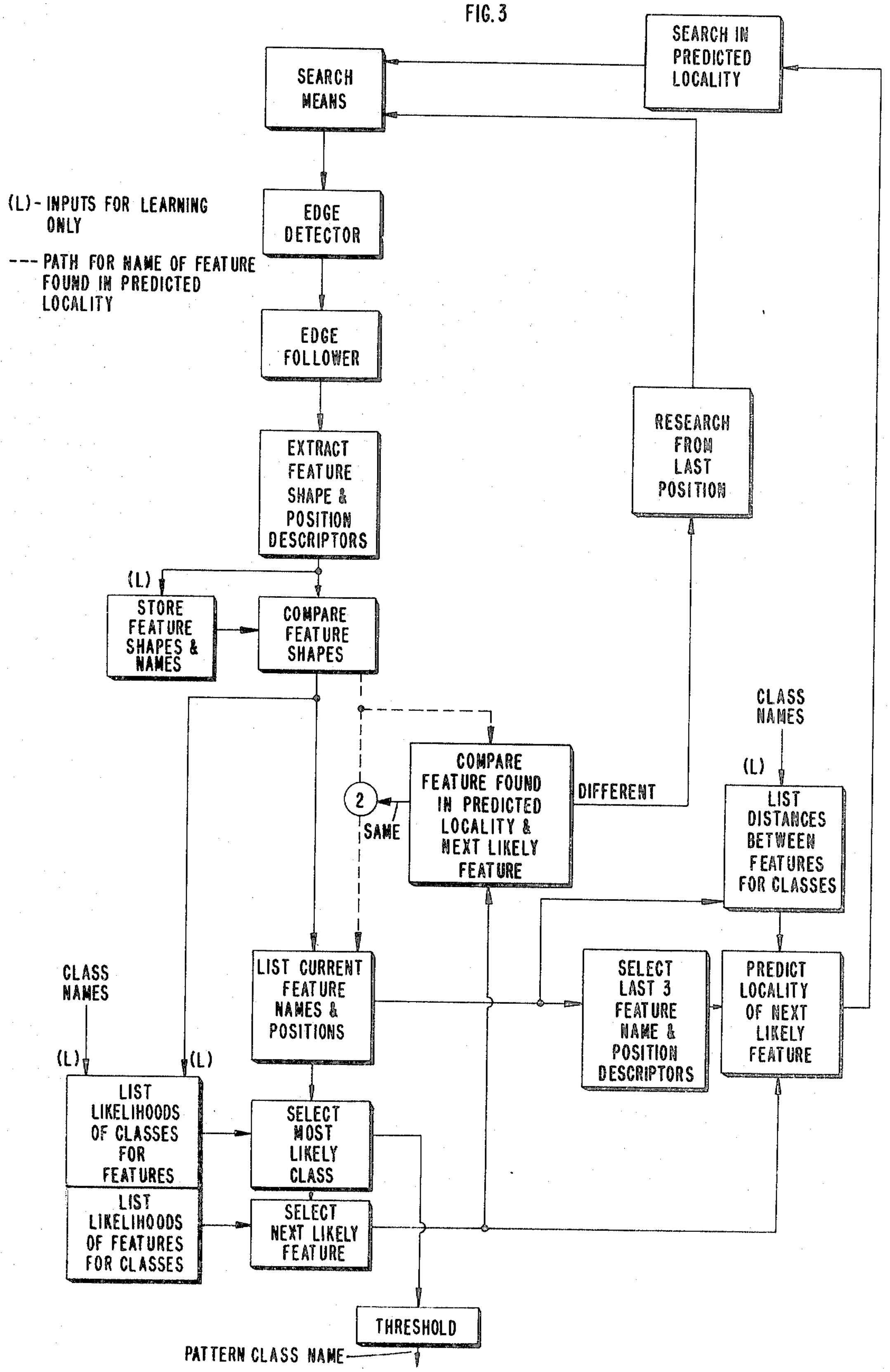

In order that the invention may be clearly understood and readily carried into effect it will now be described with reference to the accompanying drawings in which:

FIG. 1 illustrates the search means of a pattern recognition device according to one example of the invention, FIG. 2 (which is in two parts) illustrates the recognition means of the device, the search means of which is illustrated in FIG. 1 and FIG. 3 is a simplified flow diagram showing the operational steps of the pattern-recognition device.

Referring to FIG. 1, the device comprises a camera 1 which may be a flying spot or other form of electron beam camera such as used in television. The camera 1 is arranged to scan a visual representation of a pattern which may be either an unknown pattern to be classified or a known pattern used during the self-organizing mode of operation. The camera 1 includes horizontal and vertical beam-deflecting means which receive deflecting signals X and Y from accumulating circuits 2 and 3. Two waveform generators 4 and 5 are provided for feeding scanning waveforms to the accumulating circuits 2 and 3. The generator 4 provides waveform increments to cause the circuits 2 and 3 to produce a linear scan consisting of a plurality of horizontal lines as in a television raster. The other generator 5 provides increments to cause the circuits 2 and 3 to produce a small circular scan having a diameter of the order of a pattern element size. Initially, when a new pattern is presented to the camera, the generator 4 is set in operation, to initiate a systematic search of the area in which the pattern is located, to locate an edge of the pattern. The video waveform derived from the camera is applied to an edge detector 6, which produces an output signal when the video waveform undergoes a significant deviation from its mean level, as could occur when the scanning beam encounters the edge of a pattern in the area being scanned. The edge detector 6 may be arranged to detect a deviation in either sense, but in the present example it will be assumed that it detects deviation in one sense only, say towards black. Thus edge detector 6 is constituted by a differentiating circuit and a threshold circuit adapted to produce an output signal when the gradient from white to black exceeds a given threshold. A signal produced by the edge detector 6 is applied to a bistable circuit 7 so as to switch bistable 7 to a state in which the output therefrom to a gate 8 is such as to close that gate. Closure of gate 8 prevents further application of the linear waveform increments to the circuits 2 and 3. The signal from the edge detector is also applied to a gate 5*a* to cause the output of the circular scan generator to be applied to the accumulator circuits 2 and 3, so that the beam in the camera traces a small circle, starting from the detected edge, thereby causing the edge detector to produce a further output signal. Output signals from the edge detector are applied to a coordinate generator 9 which includes a gate opened in response to the detection of an edge and passes an output signal derived from generator 5 which is indicative of the point on the circular scan at which the edge has been detected. This indication is converted in a circuit 10 into two incremental signals $\delta X$ and $\delta Y$ which are applied via the paths 11 and 12 to the accumulator circuits 2 and 3 to cause the mean position of the beam to be displaced along the detected edge. Thus increment generator 10 is constituted by a computing circuit including means for subtracting the X coordinate of each edge point from the X coordinate of the next edge point to derive $\delta X$; and subtracting the Y coordinate of each edge point from the Y coordinate of the next edge point to derive $\delta Y$. As the circular scan is not interrupted after an edge has been detected, successive signals are produced by the generator 9 representing the points in successive circular scans at which the edge is detected, and successive incremental signals $\delta X$ and $\delta Y$ cause the electron beam in the camera 1 to follow the edge of the pattern presented to the camera. The signals $\delta X$ and $\delta Y$ are applied to a computing circuit 13 which also receives the waveform increments of the generator 4 via the gate 8.

The computing circuit 18 stores successive values of $\delta X$ and $\delta Y$ and extracts 13 them a signal representing the curvature of the respective edge and feeds this curvature signal to a circuit 14, which includes a threshold circuit and produces an output signal when the curvature signal changes by more than a predetermined amount. Thus computing circuit 13 includes means of known kind for producing successive average values of the ratios $\delta Y/\delta X$ for sets of edge points, and differentiating the average values to produce successive values of the curvature of an edge. It may also include means for summing the incremental values of $\delta Y$, and summing the incremental values of $\delta X$ and utilizing the sums to compute the mean position of the edge; and means responsive to each pair of signals $\delta Y$ and $\delta X$ for computing each increment to the curve length and summing the increments to compute the curve length. When an output signal is obtained from detector 14 indicating that the curvature has changed by more than a predetermined amount, this signal is fed to open the gate 15. The circuit 13 also generates a signal representing the coordinates of a specific point, say the end point of the curve, from the incremental signals $\delta Y$ possibly $\delta X$ and the coordinates of the start of the edge and the point where the curvature changes. Signals generated by the computing circuit 13, as they were just before the curvature change occurs, are fed to a feature encoder 16. The encoder 16 is a coding circuit which produces a signal in a digital code descriptive of the feature represented by the signals received from computing circuit 13. This descriptor includes in the path 17 a representation of the coordinates of the specific point in the feature, and in another path 18 a representation of the curvature and possible position and/or curve length. The signal in the path 17 will be called the position descriptor and the signal in the path 18 will be called the shape descriptor. The signal produced by circuit 14 on detecting a significant change of curvature is also applied to the circuit 10 to stop temporarily the generation of further incremental signals $\delta X$ and $\delta Y$.

The circuit components illustrated by blocks in FIG. 1 may be of known construction. The circuits 4, 5, and 10 may be digital pulse generators, and the circuits 2 and 3 may include digital accumulators and digital-to-analog converters. The circuit 13 may be a special purpose digital computer or may be provided as a general digital computer with an appropriate program. A check circuit 19 may also be connected to the computing circuit 13, arranged to produce an output signal if signals are produced by the circuit 13 to indicate a closed loop, such as a spot on the paper. Thus circuit 19 may include means for storing the coordinates of say just the seven most recently detected points on an edge, and comparing them to determine if two are identical in which case an irrelevant loop is being followed. If such a loop is detected by the circuit 19 it applies a signal to switch the bistable 7 to the state in which an output is provided to reopen the gate 8, allowing the linear search scan to be restarted. Additionally, if the scanning beam was previously following an edge, the output from the circuit 19 may cause the generation of further increments $\delta X$, $\delta Y$, to return the beam to the previous edge.

The recognition part of the device which is shown in FIG. 2 accepts the signals in the paths 17 and 18 from the encoder 16, and it will be assumed that the rapidity of operation of this part of the device is such that edge following by the search means illustrated by FIG. 1 is restarted without significant loss of time. Alternatively, the visual pattern presented to the camera may be scanned systematically without interruption and a representation of it may be stored as electrical or magnetic signals in a storage device, for example of a digital computer, and analyzed for recognition purposes during a subsequent time interval.

Most of the signal paths shown in FIGS. 1 and 2 are for digital code signals and comprise a number of conductors in parallel, as will be clear from the context.

The means shown in FIG. 2 will be described first as though conditioned to operate in the self-organizing or "learning" mode. For this mode of operation, a number of switches 20 to 25 are changed to the alternate positions from those which are shown in FIG. 2. When so changed, the switch 20 enables a gate 26, the switch 21 enables a gate 27 and disables a gate 28, the switch 22 enables two gates 29 and 30, the switch 23 disables a gate 31, the switch 24 renders operational a computer 35, and the switch 25 enables the gates 36 and 37. When gate 31 is disabled, a bistable circuit 32 always remains in the "0" state, and thereby enables a gate 33 and disables a gate 34.

The shape descriptor in path 18 is applied to a comparator 40 in which it is compared in succession with all shape descriptors stored in a feature store 41. To each shape descriptor in the store 41 is assigned a feature name signal, which may be arbitrary being for example the respective address in the store. When a comparison is performed in comparator 40, the appropriate feature name signal is fed from 41 to a vacant address in a temporary store 42. After each comparison, the comparator 40 produces an output signal representing the degree of fit between the two signals just compared and this is fed to the same address in the temporary store 42 as the respective feature name signal. Thus there becomes stored in the temporary store 42 the full list of feature name signals in the store 41 together with signals denoting the degree of fit between the respective shape descriptor and the particular shape descriptor applied by the path 18. When the cycle of comparison is complete, an end of cycle signal is applied by the lead 43 to store 42. This initiates a search procedure in the store 42 to detect the feature name with which is associated the highest "degree of fit" signal. The feature name thus detected is applied to the gate 27. However although the gate 27 is enabled by the switch 21 in the self-organizing mode, the feature name signal can pass through the gate only if there is a simultaneous signal on the lead 44 and this is only the case when the respective degree of fit signal exceeds an acceptance threshold as detected by a threshold circuit in store 42. Assuming that it does, the feature name signal passes to a buffer gate 45, and thence to a gate 46 which is always enabled during the self-organizing mode. From the gate 46, the feature name signal passes to a temporary store 47 which lists the feature name signals which have been accepted as a result of the above comparison process for the particular pattern presented to the camera. The store 47 is cleared as each new pattern is presented. If on the other hand the highest degree of fit signal in the temporary store 42 does not exceed the acceptance threshold, a signal appears on the lead 50 and passes through the gate 26 to enable two further gates 51 and 52. The gate 51 causes the unaccepted descriptor signal to be entered into the first vacant addresses in the store 41, and the gate 52 then feeds the corresponding address signal (which is now a new feature name signal) via the gates 45 and 46 to the feature name store 47. Each feature name signal applied to the store 47 is also applied by path 80 and gate 29 to a computer 55. It will also be applied via 47 to a computer 54. The computer 54 is called the feature probability computer and the computer 55 is called the class probability computer. The functioning of these computers will be referred to subsequently.

When the pattern recognition device is operated in the self-organizing mode, patterns in every class which the device will be subsequently called upon to recognize are presented to the camera 1, including many variants in every class representative of such variants as are likely to be encountered in the patterns which the device will subsequently be called upon to classify. It will therefore be appreciated that as the number of patterns presented to the camera 1 grows, there will be developed in the store 41, in different addresses, a comprehensive list of shape descriptors, associated with respective feature name signals. The list will however be the minimum required to identify every feature extracted by the search means illustrated in FIG. 1 with the degree of assurance established by the acceptance threshold in the store 42.

Considering again the analysis of a single pattern during the self-organizing mode, every time an accepted descriptor is set up by the encoder 16, resulting as above described in a feature name signal being added to the list in the store 47, the position descriptor (namely the X and Y coordinates) of the same feature is applied by the lead 17 to a temporary store 53, which is cleared as each new pattern is presented to the camera 1. Therefore as a list of features in the pattern is built up in the store 47, so there is built up in the store 53 a list of corresponding position descriptors. Moreover, when a pattern is presented in the self-organizing mode, the operator applies to an encoder 84 a signal representing the correct class name of the pattern. This signal, in digital code, is applied by path 81 by the gate 30 to the feature probability computer 54, the class probability computer 55 and a distance computer 35. The computer 35 receives the feature name list from the store 47 and the position descriptor list from the store 53 for the respective pattern and it computes the distances between every two of the features in the list stored in 47 with the aid of the position descriptors received from the store 53. The computer 35 also includes a permanent store in which are stored, in different matrices for each class, the mean distances between the features of all pairs of features in the list for a given class. The distances computed for a new pattern are used to update the mean distances in the respective matrix of the store in 35, if such a matrix already exists for the class, or is fed into an unoccupied matrix if the class has not previously been encountered.

The computer 54 is arranged to count the number of times a particular feature name is set up for a given class and to store the count with the respective feature name signal in respective matrices of a store included in the computer 54. The stored counts in any one storage matrix of the computer 54 are therefore related to the likelihoods of finding features when a pattern of the respective class is encountered. The computer 55 performs a converse function to that performed by the computer 54. As feature name signals and class name signals are fed to it, during the self-organizing mode, it computes the likelihoods of classes for given features and stores the likelihoods in association with respective feature name signals and class name signals. The likelihoods signals of classes are computed in accordance with the following formula:

$$Vcx = \frac{Ncx+1}{\sum_{p} Npx+M}$$

In this formula:

$Vcx$ is the likelihood of the feature named $x$ being encountered in patterns of the class named $c$.

$Ncx$ is the number of times feature named $x$ has been issued for all presentations of class $c$ as the input pattern.

$Npx$ is the number of times the feature named $x$ has been issued over all presentations of class $p$ as the input pattern.

$M$ is the number of classes.

The above formula for $Vcx$ is chosen so that if a rare feature, not previously detected for a particular class during the self-organizing mode is subsequently extracted during the recognition mode, then the likelihood for this feature is taken as a near chance value rather than zero.

As each feature name signal is applied to the computer 55 the corresponding list of likelihoods of different classes (as computed up to that time) is fed from the store in computer 55 to a sequential class name predictor 38. This includes a temporary store for each class name and the corresponding likelihood and as successive feature names are added to the list in the store 47 successive lists of likelihoods of class names are fed from the store 55 to the predictor 38. The predictor 38 develops a confidence level signal for every class, which is related to the product of all the likelihoods received for the respective class divided by the sum of the corresponding products for all classes. The predictor 38 also includes means for selecting the predicted class name having the highest confidence level signal thus generated, and for applying it by lead 62 to the gate 61 and to a comparator 63. When the highest confidence level signal exceeds an acceptance threshold, a signal is applied by lead 60 to open the gate 61 and allow the selected class name to be fed to an output terminal 64. The output is not however used in the self-organizing mode except as a check. The class name on the lead 62, whether or not the corresponding confidence level signal has exceeded the acceptance threshold, is compared in the comparator 63, with the correct class name from the encoder 84. If the compared signals agree a signal is fed through the gate 37 on the lead 65 to the predictor 38. If on the other hand the compared signals disagree, a signal is fed to the predictor 38 through the gate 36 on the lead 66. The signals on the leads 65 and 66 may be used for adjusting the acceptance level for different classes in the predictor 38 or otherwise weighting various parameters of the system.

As previously indicated the bistable circuit 32 remains in the "0" state throughout the self-organizing mode so that the gate 33 is always open (as is the gate 46). At some time after a feature name has been entered in the store 47, sufficient to make allowance for the completion of computations, a signal is fed through the gate 33 to the circuit 10 by path 82 to restart the derivation of the incremental signals $\delta X$ and $\delta Y$, so that the edge following of the pattern continues. This signal is derived as shown from the store 47, and as will be described later, may also function as a "jump back" signal in the recognition mode.

The recognition means shown in FIG. 2 include in addition to the components already described, a locality predictor 71, a counter 72 and a comparator 73. These are required to operate only during the recognition mode of operation, and this mode will now be described. It will be understood that in this mode, the switches 20 to 25 occupy the positions shown in the drawing so that the gates 26, 27, 29, 30, 36, and 37 are disabled and the gates 28 and 31 are enabled. The bistable circuit 32 may now assume either state, and the computer 35 remains inoperative, although mean distance values may be extracted from its storage matrices.

When a pattern to be recognized is presented to the camera 1, the stores 42, 47, and 53 are cleared, and the bistable circuit 32 is in the "0" state. The search means shown in FIG. 1 starts a systematic scan of the area of which the pattern is located, under the control of the circuit 4. This continues until the scanning beam encounters an edge of the pattern and then the search means changes to its edge-following mode of operation causing a first feature signal to be generated in due course by the computer 13 and to be encoded by the encoder 16. The shape descriptor of the feature signal is applied to the comparator 40, and the position descriptor is applied to the temporary store 53, in the same way as in the self-organizing mode of operation. The shape descriptor is compared with all shape descriptors in the store 41, and the list of feature names is set up in the temporary store 42 together with degree of fit signals. At the end of the comparison cycle, the feature name signal in the store 42 associated with the highest degree of fit signal is fed through the gates 28, 45, and 46 to the store 47. No acceptance threshold is employed in selecting the feature name signal from the store 42 the threshold circuit therein being rendered inoperative in this mode of operation. Each time a feature name signal is fed to the store 47, a signal is applied to the gate 31 and also by way of a delay device 85 to the counter 72. The counter 72 produces an output to enable the gate 31 after receiving two signals from the store 47. Before then, the gate 31 is disabled and no change occurs in the state of the bistable circuit 32. The gate 33 remains enabled and a signal is passed through it from the store 47 to the generator 10 of the search means to restart the edge-following mode. Therefore the above sequence of events occurs for the first two features of a pattern identified by the search means of FIG. 1. However when a third feature has been identified, and the third feature name signal has been entered in the store 47, the signal which is fed to the gate 31 is now able to pass to the bistable circuit 32 and change it to the "1" state. The change of the bistable circuit 32 to the "1" state enables the gate 34, disables the gate 33 and removes from the gate 46 the enabling signal otherwise applied via gate 74 from the bistable circuit 32. The gate 34 is arranged to pass the output signal of the predictor 72 by way of path 83 to the accumulator circuits 2 and 3, to the computer 13 of the search means, and to a temporary store 86. The function of the predictor 71 will now be considered.

As each feature name signal is added to the store 47 the predictor 38 extracts the list of the class probabilities from the store in the computer 55 and updates all the class probabilities in its own store, as during the self-organizing mode. The class name with the greatest likelihood of being correct is selected and applied to the feature probability computer 54. There it initiates the selection of the feature name which has the highest probability of occurrence in the predicted class (after any feature names already in the store 47). It will be recalled that the feature probabilities were evaluated during the self-organizing mode. The selected feature name signal is then fed to the computer 71, and to a comparison circuit 73. The computer 71 additionally receives the last three position descriptors from the store 53 and the respective feature name signals from the store 47.

It then selects the signals from the store in the computer 35 representing the mean distance of the predicted feature from each one of the other three features. Using these mean distances, the computer 71 computes, by a triangulation technique, the incremental displacements in X and Y coordinates required to displace the scanning beam of the camera 1 from its present position to the locality of the predicted feature. The corresponding signals are applied to the search means through the gate 34 as above described. The signals computed by 71 may in fact be a sequence of signals to cause a systematic search to be carried out over a small area in the predicted locality until an edge is detected, the search being then discontinued by an output from the edge detector, as previously described.

When a feature is encountered in the predicted locality the edge-following mode of operation is pursued until the feature is encoded and fed to the comparator 40. The feature name signal best fitted to the feature thus detected is then selected from the store 41 by the technique previously described and is fed through the gates 28 and 45 to the comparator 73 to be compared with the predicted feature name signal from the computer 54. If the signals compared in 73 are the same a signal is passed through a gate 74 to enable the gate 47 and to allow the predicted feature name to be entered in the store 47 and used in the next sequence of prediction in the predictor 38. If however the two signals compared in the comparator 73 differ, an output is fed to the bistable circuit 32 to restore it to the "0" state and reenable the gate 33, restarting the edge-following mode of operation of the search means of FIG. 1.

It will be observed that the "continue" signal on the lead 82 is also applied to the temporary store 86. It functions to clear this store and feed the output, in subtractive sense, to the X and Y accumulators 2 and 3 and to the computer 13. The edge following is therefore restarted at the position of the beam before the unsuccessful prediction was made. During the self-organizing mode, store 86 plays no part, since no predictions are made. The predicted feature name signal is not in the case of an unsuccessful prediction passed to the store 47.

In this way, by successive predictions, some of which may be successful and some unsuccessful, the confidence level of the class name prediction made by the predictor 38 is varied until it exceeds the acceptance threshold and opens the gate 61, allowing a class name signal to be fed to the output terminal 64 representing the response of the device to the pattern to be classified. The predictor 38 therefore functions as decision means in this mode of operation.

The computers, predictors, and stores which are represented by block diagrams in FIGS. 1 and 2 of the drawing have not been shown in detail since in the practical form of the invention which is being described they are provided by an "on line" digital computer programmed to perform in appropriate sequence the various functions above described. It will be understood that any general purpose digital computer can be programmed appropriately. A simplified flow diagram of the operational steps of such a computer is shown in FIG. 3.

Many modifications may of course be made in the invention. For example feature extraction may be based on a clustering technique instead of an edge following or contouring technique. MOreover the device may be arranged to operate with more than one level of prediction, for example the feature name signals in the store 47 may first be used to select predicted group names, where groups are commonly recurring combinations of features, and the group names so predicted may then be used to select class names. The search means shown in FIG. 1 may also be arranged to follow lines of a pattern instead of following edges of a pattern. The small circular scan would then straddle the lines. In this case the output signals from the camera 1 could be fed not only to a curvature computer but to detectors arranged to detect crossings and/or junctions and these could be used as special feature descriptors in the prediction process. The device may also include means which may be controlled by the operator during the self-organizing mode for directing the scanning beam to the inside edge of a pattern.

What we claim is:

1. A pattern recognition device including:

a. search means for searching a pattern to be classified for features and for producing signals descriptive of features sensed by said search means, b. storage means conditioned to store 1. signals representative of respective features,
   2. a list of the likelihoods of classes of patterns for given features,
   3. a list of the likelihoods of features for given classes, and
   4. a list of the mean distances between each pair of features for each different class of pattern, c. means for utilizing said descriptive signals in conjunction with said signals representative of respective features to determine the most likely identities of successive features of said pattern, d. means conditioned to utilize said list of the likelihoods of classes of patterns for given features in conjunction with the most likely identities of a predetermined plural number of features of said pattern to compute different class likelihoods for said pattern, and to select from said storage means a signal representative of the class having the highest such likelihood, e. means for utilizing said signal representative of the class having the highest such likelihood in conjunction with said list of the likelihoods of features for given classes to select from said storage means a signal representative of another feature which is likely to be associated with said predetermined plural number of features, f. means conditioned to compute a signal representative of the relative locality of said likely feature, utilizing the mean distances of said likely feature from each of said plural number of features, g. means for searching said pattern at said locality and producing a further signal descriptive of a feature sensed at said locality, and h. means for utilizing said further descriptive signal in deciding if the class having the highest such likelihood remains the most likely class.

2. A device according to claim 1 in which the search means includes means for producing, as the signals descriptive of features, signals which are at least descriptive of the curvatures of an edge of the pattern over regions in which the curvature is substantially constant.

3. A device according to claim 2 in which said search means includes an electron beam-scanning means, and means for causing the electron beam to follow the edge of the pattern.

4. A device according to claim 1 having a self-organizing mode in which it is adapted to accumulate said lists in said storage means in response to the operation of said search means on representative patterns.

* * * * *